(12) United States Patent
Humne et al.

(10) Patent No.: US 12,650,986 B1
(45) Date of Patent: Jun. 9, 2026

(54) SYSTEM AND METHOD TO GENERATE A DYNAMIC AND QUERY ADAPTIVE BLOOM FILTER FOR OPTIMAL JOINING OF TABLES

(71) Applicant: Morgan Stanley Services Group Inc., New York, NY (US)

(72) Inventors: Prasad Shashikant Humne, Mumbai (IN); Abhishek Pancharia, Mumbai (IN); Shreyas Angane, Mumbai (IN); Bindu Sharma, Mumbai (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/448,959

(22) Filed: Jan. 14, 2026

(51) Int. Cl.
G06F 7/00 (2006.01)
G06F 16/2453 (2019.01)

(52) U.S. Cl.
CPC .. *G06F 16/24542* (2019.01); *G06F 16/24537* (2019.01)

(58) Field of Classification Search
CPC ......... G06F 16/24542; G06F 16/24537; G06F 16/2455; G06F 16/24557; G06F 16/334; G06F 16/8373
See application file for complete search history.

(56) References Cited

U.S. PATENT DOCUMENTS

| | | | |
|---|---|---|---|
| 7,849,073 B2 * | 12/2010 | Young-Lai | ........ G06F 16/24532 707/718 |
| 8,209,368 B2 | 6/2012 | Beyer et al. | |
| 8,671,091 B2 | 3/2014 | Cherniack et al. | |
| 8,762,396 B2 | 6/2014 | Hudzia et al. | |
| 8,972,337 B1 | 3/2015 | Gupta | |
| 9,367,574 B2 | 6/2016 | Gupta | |
| 10,642,840 B1 * | 5/2020 | Attaluri | ................ G06F 16/335 |
| 10,769,150 B1 * | 9/2020 | Cruanes | ............. G06F 16/2272 |
| 11,803,545 B1 * | 10/2023 | Chong | .................. G06F 16/284 |
| 11,995,080 B1 * | 5/2024 | Tsirogiannis | ..... G06F 16/24549 |
| 12,287,793 B1 | 4/2025 | Thunuguntla et al. | |
| 12,450,233 B1 * | 10/2025 | Cheng | ............... G06F 16/24545 |
| 2006/0294311 A1 | 12/2006 | Fu et al. | |
| 2009/0228433 A1 * | 9/2009 | Aguilar Saborit | .......................... G06F 16/24556 |

(Continued)

OTHER PUBLICATIONS

Mehringer et al., "Hierarchical Interleaved Bloom Filter: enabling ultrafast, approximate sequence queries", Genome Biology, May 2023, pp. 1-25.

(Continued)

*Primary Examiner* — Mohammed R Uddin
(74) *Attorney, Agent, or Firm* — Leason Ellis LLP

(57) ABSTRACT

A system and method generate a dynamic and query adaptive Bloom filter for optimal joining of tables such as large tables in distributed data processing systems. A Bloom filter is dynamically constructed and tuned based on historical query patterns including frequency and selectivity. Metrics are collected from execution of an Adaptive Query Execution (AQE) based execution plan and execution of a Bloom filter-based execution plan generated from the constructed and tuned Bloom filter. A score measuring performance of the execution plans is generated from the metrics of each of the execution plans. The execution plan with a greater score is selected to optimally join the tables. The method implements the system.

14 Claims, 7 Drawing Sheets

(56)     References Cited

U.S. PATENT DOCUMENTS

| | | | |
|---|---|---|---|
| 2014/0095475 A1* | 4/2014 | Su ..................... | G06F 16/24544 |
| | | | 707/718 |
| 2015/0261820 A1* | 9/2015 | Cheng .............. | G06F 16/24544 |
| | | | 707/718 |
| 2016/0034486 A1* | 2/2016 | Dageville .......... | G06F 16/2255 |
| | | | 707/754 |
| 2017/0286485 A1 | 10/2017 | Chandramouli et al. | |
| 2018/0349364 A1 | 12/2018 | Arnold et al. | |
| 2018/0357434 A1 | 12/2018 | Roy | |
| 2019/0236188 A1* | 8/2019 | McKenna ......... | G06F 16/24565 |
| 2020/0142894 A1* | 5/2020 | Papaemmanouil .......................... | |
| | | | G06F 16/2453 |
| 2021/0089535 A1* | 3/2021 | Chen ................ | G06F 16/24542 |
| 2021/0263929 A1* | 8/2021 | Chen ................ | G06F 16/24539 |
| 2024/0054132 A1* | 2/2024 | Ozawa ................ | G06F 16/2456 |
| 2024/0362222 A1* | 10/2024 | Cui .................. | G06F 16/24539 |
| 2025/0321961 A1* | 10/2025 | Saupe .............. | G06F 16/24532 |
| 2026/0079939 A1* | 3/2026 | Cho ................. | G06F 16/24544 |

OTHER PUBLICATIONS

Zou et al., "A Learned Prefix Bloom Filter for Spatial Data", Advances in Multimedia Information Processing, Jul. 2022, pp. 336-350.

* cited by examiner

300

310

EXECUTION PLAN

HASH VALUE: 49712648

302

TABLE C
TABLE A
...
TABLE Z
TABLE B

304

INDEX SCAN (table 1, column 4, row 5)
TABLE SCAN
INDEX SCAN (table 4, column 3, row 1)
...
INDEX SCAN (table 1, column 1, row 2)

306 filtering
aggregating
joining
....
sorting

308 join operator
filter operator
...
nested loop operator
hash join operator

SYSTEM AND METHOD TO GENERATE A DYNAMIC AND QUERY ADAPTIVE BLOOM FILTER FOR OPTIMAL JOINING OF TABLES

FIELD OF THE DISCLOSURE

The present disclosure relates generally to Bloom filters, and, more particularly, to a system and a method generate a dynamic and query adaptive Bloom filter for optimal joining of tables.

BACKGROUND OF THE DISCLOSURE

Joining large tables in distributed data processing systems is computationally intensive due to high memory usage, disk input/output (I/O), and data shuffling or data exchanging during the join operation. Shuffles or exchanges occur when processing and handling data in tables and databases as data is partitioned when the steps of a joining are performed.

Bloom filters are commonly used to filter non-matching records before joins, reducing data movement. However, known Bloom filters are static, requiring predefined parameters that may not adapt to varying query patterns or data distributions. For example, known static Bloom filters implement columnar database joins, focusing on I/O reduction without dynamic tuning. Other known Bloom filters implement cardinality estimation but lack adaptability based on query history.

The known Adaptive Query Execution (AQE) technique is publicly available from the APACHE SOFTWARE FOUNDATION for use in the SPARK open-source unified analytics engine publicly available from the APACHE SOFTWARE FOUNDATION. AQE was introduced in SPARK 3.0 in 2020, which dynamically reoptimizes query plans at runtime based on statistics, such as switching to broadcast joins or coalescing partitions. However, AQE relies on runtime data and does not leverage historical query patterns or cache execution plans for reuse. Academic works such as the known Compressed Bloom Filter Join and the known Hierarchical Interleaved Bloom Filter have proposed dynamic Bloom filters, but focus on specific domains, such as MapReduce applications and bioinformatics applications, without integrating query history or plan reuse. Other known systems cache query results but not execution plans with Bloom filters, and additional known systems optimize queries conforming to applications publicly available from SNOWFLAKE, INC. without addressing Bloom filters or historical patterns.

Existing solutions for performing joins of tables lack a unified approach to combine query history analysis, hash-based plan reuse, and dynamic Bloom filter tuning for distributed joins. There is a need for a system that intelligently adapts to recurring query patterns, optimizes memory usage, and outperforms runtime-only optimizations such as AQE, particularly for large-scale table joins in distributed environments.

SUMMARY OF THE DISCLOSURE

According to an implementation consistent with the present disclosure, a system and a method generate a dynamic and query adaptive Bloom filter for optimal joining of tables.

In an implementation, a computer-based join management system comprises a communication interface, a hardware-based processor, a memory, and a set of modules. The communication interface is configured to receive a query to join a plurality of initial tables. The memory is configured to store instructions and configured to provide the instructions to the hardware-based processor, with the memory including an execution plan cache configured to store an Adaptive Query Execution (AQE) based execution plan and at least one stored Bloom filter-based execution plan including a first stored Bloom filter-based execution plan, wherein each at least one stored Bloom filter-based execution plan is associated with a respective stored unique Bloom filter-based hash value. The set of modules is configured to implement the instructions provided to the hardware-based processor. The set of modules includes a query hash module, a Bloom filter manager module, a join optimizer module, and a benchmark module. The query hash module is configured to generate a unique query-based hash value from the query, to determine the case that the unique query-based hash value matches a unique stored hash value associated with the first stored Bloom filter-based execution plan, and in the case that the unique query-based hash value matches the stored unique Bloom filter-based hash value associated with the first stored Bloom filter-based execution plan, to select the first stored Bloom filter-based execution plan as a selected execution plan.

The Bloom filter manager module is configured, responsive to the case of no match of the unique query-based hash value, to construct a new Bloom filter and to generate a new Bloom filter-based execution plan corresponding to the generated new Bloom filter. The join optimizer module is configured to execute the AQE-based execution plan and to execute the new Bloom filter-based execution plan. The benchmarking module is configured, responsive to the case of no match of the unique query-based hash value, to collect a metric for the executed AQE-based execution plan and for the executed new Bloom filter-based execution plan, to generate a pair of scores from the metric for each of the executed AQE-based execution plan and the executed new Bloom filter-based execution plan, to determine a greater score from among the generated pair of scores, and to select from the executed AQE-based execution plan and the executed new Bloom filter-based execution plan with the greater score to be the selected execution plan. The join optimizer module executes the selected execution plan to join the plurality of initial tables to generate and output a joined table.

The set of modules can further comprise a query parser module configured to extract query data from the query, wherein the query data is selected from the group consisting of a structure of the query, a join condition, a join key, and a predicate, and the query hash module generates the unique query-based hash value from query and from the extracted query data. The set of modules can further comprise a query normalization module configured to detect a case that the query is in a normalized form, and responsive to the case that the query is not in the normalized form, to normalize the query. The plurality of tables can be stored in a distributed data processing system. The memory can further comprise a query history storage configured to store historical query data including a plurality of historical query patterns, wherein each historical query pattern includes a query frequency and a join selectivity, and wherein the Bloom filter manager module tunes the new Bloom filter based on parameters using the plurality of historical query patterns.

The benchmarking module can collect the metric selected from the group consisting of: the number of shuffle bytes, an execution time, and a memory usage of each of the executed AQE-based execution plan and the executed new Bloom filter-based execution plan. The benchmarking module can generate the pair of scores as a pair of weighted scores for each of the executed AQE-based execution plan and the executed new Bloom filter-based execution plan, and wherein the weighted scores are determined from a predetermined weighting rule using weights of 50% for the number of shuffle bytes, 30% for the execution time, and 20% for the memory usage.

In another implementation, a computer-based method joins a plurality of initial tables and comprises storing at least one unique Bloom filter-based hash value including a unique first Bloom filter-based hash value; storing an Adaptive Query Execution (AQE) based execution plan and at least one Bloom filter-based execution plan including a first Bloom filter-based execution plan, wherein each at least one Bloom filter-based execution plan is associated with a respective stored at least one unique Bloom filter-based hash value and the first Bloom filter-based execution plan is associated with the unique first Bloom filter-based hash value; receiving a query to join the plurality of initial tables; generating a unique query-based hash value from the query; and determining a case that the unique query-based hash value matches the unique first Bloom filter-based hash value from among the at least one unique Bloom filter-based hash value.

The method further comprises, in the case that the unique query-based hash value matches the unique first Bloom filter-based hash value associated with the first Bloom filter-based execution plan, selecting the first Bloom filter-based execution plan as a selected execution plan. In the case that the unique query-based hash value does not match any unique Bloom filter-based hash value, constructing a new Bloom filter; generating a new Bloom filter-based execution plan corresponding to the generated new Bloom filter; executing the AQE-based execution plan; executing the new Bloom filter-based execution plan; collecting a metric for the executed AQE-based execution plan and for the executed new Bloom filter-based execution plan; and generating a pair of scores from the metric for each of the executed AQE-based execution plan and the executed new Bloom filter-based execution plan;

The method further comprises, in the case that the unique query-based hash value does not match any unique Bloom filter-based hash value, determining a greater score from among the generated pair of scores; selecting from the executed AQE-based execution plan and the executed new Bloom filter-based execution plan with the greater score to be the selected execution plan. The method further comprises executing the selected execution plan to join the plurality of initial tables to generate the joined table, and outputting the joined table.

The method can further comprise, prior to generating the unique query-based hash value, extracting query data from the query, wherein the query data is selected from the group consisting of a structure of the query, a join condition, a join key, and a predicate, and wherein generating the unique query-based hash value from query and from the extracted query data. The method can further comprise, prior to generating the unique query-based hash value, detecting a case that the query is in a normalized form; and prior to generating the unique query-based hash value, responsive to the case that the query is not in the normalized form, normalizing the query. The plurality of tables can be stored in a distributed data processing system. The method can further comprise storing historical query data including a plurality of historical query patterns, wherein each historical query pattern includes a query frequency and a join selectivity; and prior to generating a new Bloom filter-based execution plan corresponding to the generated new Bloom filter, tuning the new Bloom filter based on parameters using the plurality of historical query patterns. The metric can be selected from the group consisting of: the number of shuffle bytes, an execution time, and a memory usage of each of the executed AQE-based execution plan and the executed new Bloom filter-based execution plan. Generating the pair of scores can include generating a pair of weighted scores for each of the executed AQE-based execution plan and the executed new Bloom filter-based execution plan, wherein the weighted scores are determined from a predetermined weighting rule using weights of 50% for the number of shuffle bytes, 30% for the execution time, and 20% for the memory usage.

In a further implementation, a non-transitory computer-readable storage medium stores instructions executable by a processor to join a plurality of initial tables, with the instructions comprising store at least one unique Bloom filter-based hash value including a unique first Bloom filter-based hash value; store an Adaptive Query Execution (AQE) based execution plan and at least one Bloom filter-based execution plan including a first Bloom filter-based execution plan, wherein each at least one Bloom filter-based execution plan is associated with a respective stored at least one unique Bloom filter-based hash value and the first Bloom filter-based execution plan is associated with the unique first Bloom filter-based hash value; receive a query to join the plurality of initial tables; generate a unique query-based hash value from the query; determine a case that the unique query-based hash value matches the unique first Bloom filter-based hash value from among the at least one unique Bloom filter-based hash value; and in the case that the unique query-based hash value matches the unique first Bloom filter-based hash value associated with the first Bloom filter-based execution plan, select the first Bloom filter-based execution plan as a selected execution plan.

The instructions further comprise in the case that the unique query-based hash value does not match any unique Bloom filter-based hash value, construct a new Bloom filter; generate a new Bloom filter-based execution plan corresponding to the generated new Bloom filter; execute the AQE-based execution plan; execute the new Bloom filter-based execution plan; collect a metric for the executed AQE-based execution plan and for the executed new Bloom filter-based execution plan; generate a pair of scores from the metric for each of the executed AQE-based execution plan and the executed new Bloom filter-based execution plan; determine a greater score from among the generated pair of scores; and select from the executed AQE-based execution plan and the executed new Bloom filter-based execution plan with the greater score to be the selected execution plan. The instructions further comprise execute the selected execution plan to join the plurality of initial tables to generate the joined table; and output the joined table.

The instructions can further comprise, prior to generating the unique query-based hash value, extracting query data from the query, wherein the query data is selected from the group consisting of a structure of the query, a join condition, a join key, and a predicate, and wherein generate the unique query-based hash value from query and from the extracted query data. The instructions can further comprise, prior to generating the unique query-based hash value, detect a case that the query is in a normalized form; and prior to generating the unique query-based hash value, responsive to the case that the query is not in the normalized form, normalize the query. The instructions can further comprise store historical query data including a plurality of historical query patterns, wherein each historical query pattern includes a query frequency and a join selectivity; and prior to generating a new Bloom filter-based execution plan corresponding to the generated new Bloom filter, tune the new Bloom filter based on parameters using the plurality of historical query patterns. The metric can be selected from the group consisting of: the number of shuffle bytes, an execution time, and a memory usage of each of the executed AQE-based execution plan and the executed new Bloom filter-based execution plan. Generating the pair of scores can include generating a pair of weighted scores for each of the executed AQE-based execution plan and the executed new Bloom filter-based execution plan, wherein the weighted scores are determined from a predetermined weighting rule using weights of 50% for the number of shuffle bytes, 30% for the execution time, and 20% for the memory usage.

Any combinations of the various embodiments, implementations, and examples disclosed herein can be used in a further implementation, consistent with the disclosure. These and other aspects and features can be appreciated from the following description of certain implementations presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments and implementations consistent with the teachings included in the present disclosure are directed to a system 100 and a method 400 to generate a dynamic and query adaptive Bloom filter to optimally join tables, large datasets, arrays, and databases. The system 100 and method 400 are applicable to distributed data processing which optimizes join operations on large datasets in various computing systems such as the SPARK open-source unified analytics engine publicly available from the APACHE SOFTWARE FOUNDATION as well as applications publicly available from SNOWFLAKE, INC. The system 100 and method 400 focus on using query history, hash-based execution plan reuse, and dynamic Bloom filters to improve performance and memory efficiency with join operations on tables.

Figure 1:
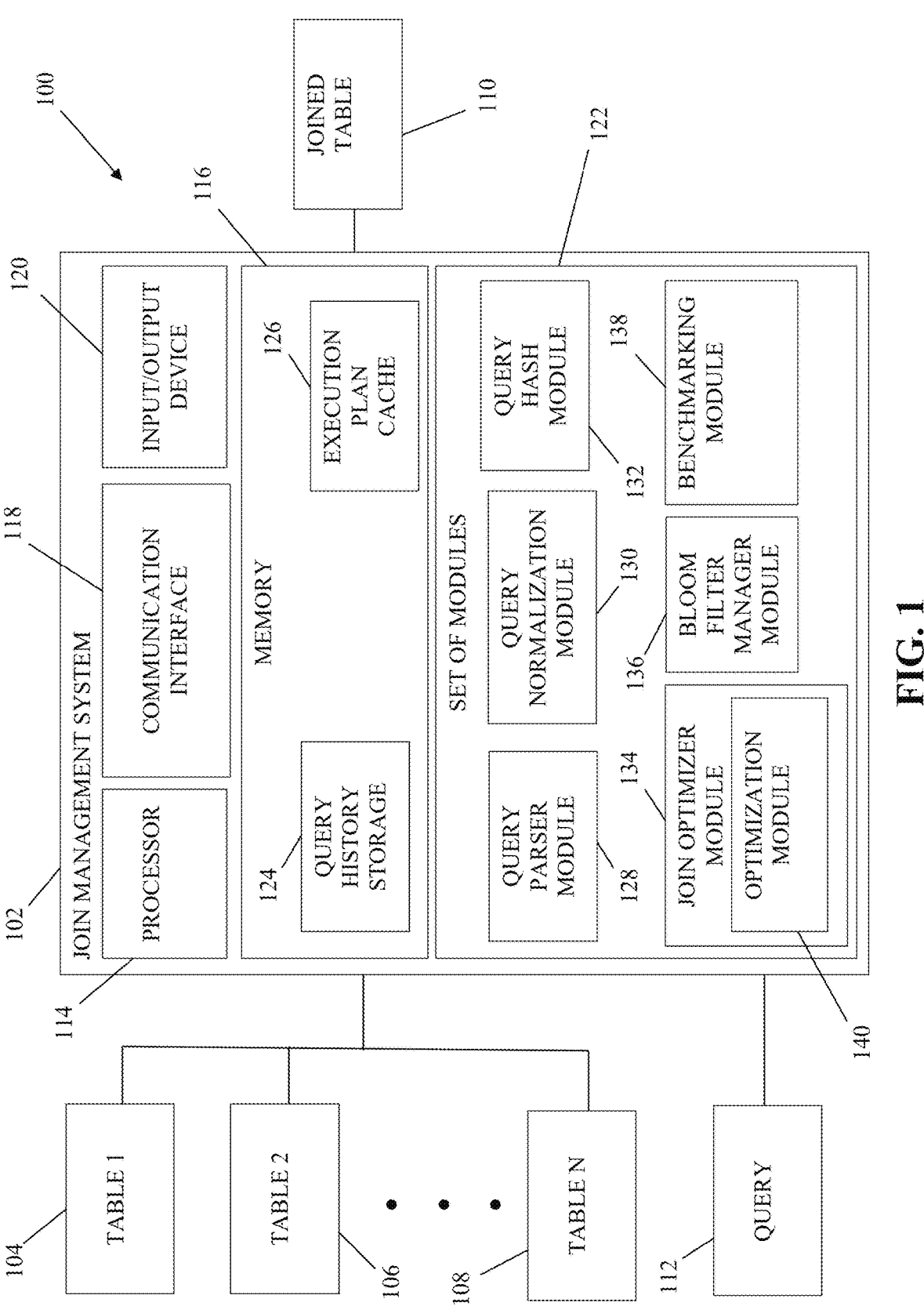
FIG. 1 is a schematic of a join management system, according to an implementation.

Referring to FIG. 1, in an implementation consistent with the invention, the system 100 includes a join management system 102 operatively connected to data sources storing a plurality of tables 104, 106, 108 to process the plurality of tables 104, 106, 108 and to create and output a joined table 110 as described below. In one implementation, the join management system 102 receives a query 112 and, in response to receiving the query 112, the join management system 102 processes the plurality of tables 104, 106, 108 to create and output the joined table 110. In an implementation, the query 112 is a Structured Query Language (SQL) based query. In another implementation, the query 112 is in any known query format. The query 112 is a join command which instructs or requests the join management system 102 to join the plurality of tables 104, 106, 108 to create and output the joined table 110.

In an implementation, the join management system 102 automatically detects for the plurality of tables 104, 106, 108 and, in response to detecting the plurality of tables 104, 106, 108, the join management system 102 processes the plurality of tables 104, 106, 108 to create and output the joined table 110. For example, the join management system 102 generates a query based on the automatically detected plurality of tables 104, 106, 108 for further processing to create and output the joined table 110.

In an implementation consistent with the invention, the join management system 102 receives a query 112 from a user through an input/output device 120, in which the user requests the joining of the plurality of tables 104, 106, 108 to create and output the joined table 110. In another implementation, the query 112 is generated automatically by an external system to prompt the joining of the plurality of tables 104, 106, 108 to create and output the joined table 110. In a further implementation, the query 112 is obtained by the join management system 102 from a set of stored queries in a query storage, such as an external query storage or the memory 116, to prompt the joining of the plurality of tables 104, 106, 108 to create and output the joined table 110.

The data sources include databases, servers, data farms, distributed storage systems, and any known storage systems. As shown in FIG. 1, the plurality of tables 104, 106, 108 are labeled "TABLE 1", "TABLE 2", etc. to "TABLE N", in which N is a positive integer greater than or equal to 2. Each of the tables 104, 106, 108 stores data in rows and columns. In one implementation, the plurality of tables 104, 106, 108 include individual tables of various sizes. In another implementation, the plurality of tables 104, 106, 108 include datasets such as large datasets. In a further implementation, the plurality of tables 104, 106, 108 are formatted as a plurality of arrays. In a still another implementation, the plurality of tables 104, 106, 108 are formatted as a plurality of databases. In an additional implementation, the plurality of tables 104, 106, 108 are formatted in any known type of data structure storing data.

In an implementation, the joined table 110 stores data in rows and columns. In another implementation, the joined table 110 includes a dataset such as a large dataset. In a further implementation, the joined table 110 is formatted as an array. In a still another implementation, the join table 110 is formatted as a database. In an additional implementation, the joined table 110 is formatted in any known type of data structure storing data.

In an implementation consistent with the invention, the system 102 includes a hardware-based processor 114, the memory 116 configured to store instructions and configured to provide the instructions to the hardware-based processor 114, a communication interface 118, an input/output device 120, and a set 122 of modules configured to implement the instructions provided to the hardware-based processor 112. The memory 114 includes a query history storage 124 and an execution plan cache 126. The set 120 of modules includes a query parser module 128, a query normalization module 130, a query hash module 132, a join optimizer module 134, a Bloom filter manager module 136, and a benchmarking module 138. The join optimizer module 134 includes an optimization module 140.

In one implementation, the system 100 and components such as the join management system 102 are operatively connected to at least one data source and other devices and systems through a network. For example, the network is the Internet. In another example, the network is an internal network or intranet of an organization. In a further example, the network is a heterogeneous or hybrid network including the Internet and the intranet. For example, the tables 104, 106, 108 are transmitted, conveyed, or otherwise provided to the join management system 102 through a network to another device such as a server for storage or use, or to a database for storage.

Figure 2:
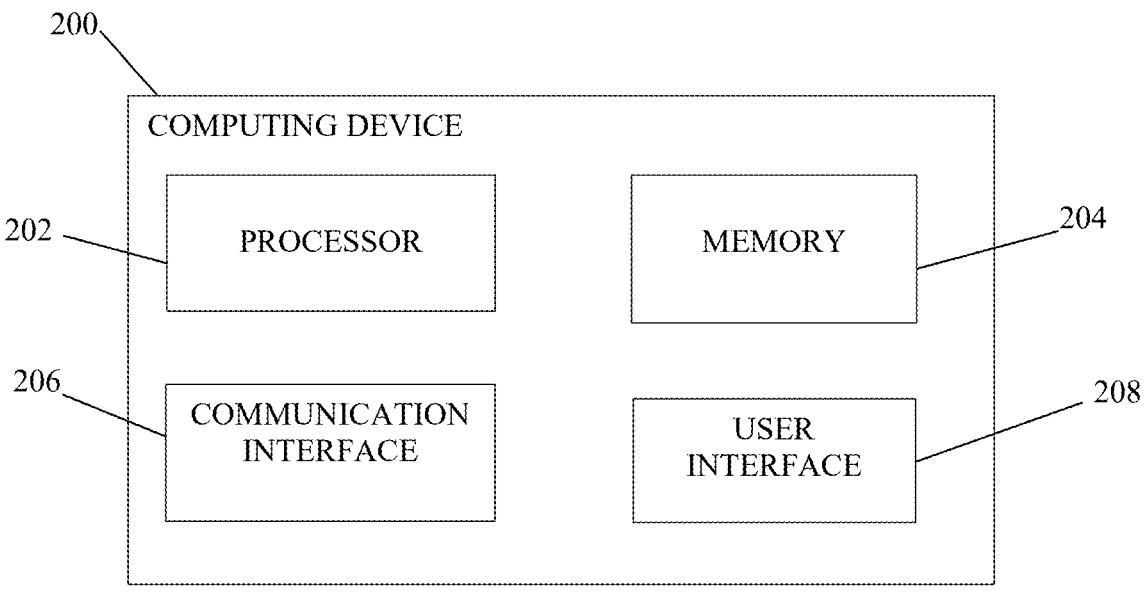
FIG. 2 is a schematic of a computing device used in the implementation of FIG. 1.

FIG. 2 illustrates a schematic of a computing device 200 including a processor 202 having code therein, a memory 204, and a communication interface 206. Optionally, the computing device 200 includes a user interface 208, such as an input device, an output device, or an input/output device. The processor 202, the memory 204, the communication interface 206, and the user interface 208 are operatively connected to each other via any known connections, such as a system bus, a network, etc. Any component, combination of components, and modules of the system 100 in FIG. 1 are, for example, implemented by a respective computing device 200 and described below. In one implementation, a module includes software, such as an application, a procedure, a subroutine, a software-based object, or any known type of software. In another implementation, a module includes hardware, such as a hardware-based computing device, a hardware-based processor, a microprocessor, or any known type of hardware configured to perform functions. In a further implementation, a module includes both software and hardware.

For example, each of the processor 114, the communication interface 118, the input/output device 120, the set 122 of modules, the query parser module 128, the query normalization module 130, the query hash module 132, the join optimizer module 134, the Bloom filter manager module 136, the benchmarking module 138, and the optimization module 140 shown in FIG. 1 is implemented by a respective computing device 200 shown in FIG. 2 and described below.

It is to be understood that the computing device 200 can include different components. Alternatively, the computing device 200 can include additional components. In another alternative implementation, some or all of the functions of a given component can instead be carried out by one or more different components. The computing device 200 can be implemented by a virtual computing device. Alternatively, the computing device 200 can be implemented by one or more computing resources in a cloud computing environment. Additionally, the computing device 200 can be implemented by a plurality of any known computing devices.

The processor 202 can be a hardware-based processor implementing a system, a sub-system, or a module. The processor 202 can include one or more general-purpose processors. Alternatively, the processor 202 can include one or more special-purpose processors. The processor 202 can be integrated in whole or in part with the memory 204, the communication interface 206, and the user interface 208. In another alternative implementation, the processor 202 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 202 can include a plurality of processing elements configured to perform parallel processing. In a further alternative implementation, the processor 202 can include a plurality of neural nodes or artificial neurons configured as an artificial neural network. The processor 202 can be configured to implement any known machine learning (ML) based devices, any known artificial intelligence (AI) based devices, and any known artificial neural networks, including a convolutional neural network (CNN).

The memory 204 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 202 can be stored in a memory internal to the processor 202. The code can be instructions implemented in hardware. Alternatively, the code can be instructions implemented in software. The instructions can be machine-language instructions executable by the processor 202 to cause the computing device 200 to perform the functions of the computing device 200 described herein. Alternatively, the instructions can include script instructions executable by a script interpreter configured to cause the processor 202 and computing device 200 to execute the instructions specified in the script instructions. In another alternative implementation, the instructions are executable by the processor 202 to cause the computing device 200 to execute an artificial neural network. The processor 202 can be implemented using hardware or software, such as the code. The processor 202 can implement a system, a sub-system, or a module, as described herein.

The memory 204 can store data in any known format, such as databases, data structures, data lakes, or network parameters of a neural network. The data can be stored in a table, a flat file, data in a filesystem, a heap file, a B+ tree, a hash table, or a hash bucket. The memory 204 can be implemented by any known memory, including random access memory (RAM), cache memory, register memory, or any other known memory device configured to store instructions or data for rapid access by the processor 202, including storage of instructions during execution.

The communication interface 206 can be any known device configured to perform the communication interface functions of the computing device 200 described herein. The communication interface 206 can implement wired communication between the computing device 200 and another entity. Alternatively, the communication interface 206 can implement wireless communication between the computing device 200 and another entity. The communication interface 206 can be implemented by an Ethernet, Wi-Fi, Bluetooth, or USB interface. The communication interface 206 can transmit and receive data over a network and to other devices using any known communication link or communication protocol.

The user interface 208 can be any known device configured to perform user input and output functions. The user interface 208 can be configured to receive an input from a user. Alternatively, the user interface 208 can be configured to output information to the user. The user interface 208 can be a display, a computer monitor, a television, a loudspeaker, a computer speaker, or any other known device operatively connected to the computing device 200 and configured to output information to the user. A user input can be received through the user interface 208 implementing a keyboard, a mouse, or any other known device operatively connected to the computing device 200 to input information from the user. Alternatively, the user interface 208 can be implemented by any known touchscreen. In one implementation, the user interface 208 displays a graphical user interface (GUI) interacting with the user through the operation of a keyboard, a mouse, a touchscreen, or any other known user interface (UI) device. The computing device 200 can include a server, a personal computer, a laptop, a smartphone, or a tablet.

Referring to FIG. 1, in operation, the join management system 102 receives the query 112; for example, from a user through the input/output device 120. An example query, which is a join command, is:

SELECT * FROM orders JOIN customers ON orders.cust_id=customers.cust_id WHERE orders.date>"2025 Jan. 1")

which joins all data from a table named "orders" with all data from a table named "customers" to create the joined table 110 for all orders having, for example, the Gregorian date after "2025 Jan. 1".

In one implementation, the join operation above uses the command "JOIN" to combine rows from two or more tables based on a related column between the tables. In another implementation, the join operation is an inner join using the command "INNER JOIN" instead of "JOIN" in the example above to return only rows in which there is a match in both tables. In an additional implementation, the join operation is a left join or a left outer join using the command "LEFT JOIN" instead of "JOIN" in the example above to return all rows from the left table, and matched rows from the right table. If there is no match, NULLs are returned for right table columns.

In a further implementation, the join operation is a right join or a right outer join using the command "RIGHT JOIN" instead of "JOIN" in the example above to return all rows from the right table, and matched rows from the left table. In still another implementation, the join operation is a full join or a full outer using the command "FULL JOIN" instead of "JOIN" in the example above to return all rows when there is a match in either table. Non-matching rows will have NULLs. In yet another implementation, the join operation is a cross join using the command "CROSS JOIN" instead of "JOIN" in the example above to return the Cartesian product of both tables in which every row from the table "orders" is combined with every row from table "customers" as in the above example to provide every possible order-customer combination. In an additional implementation, the join operation is specified in the query 112 using any known type of join command. Furthermore, the join management system 102 performs the join operation using any known multi-dimensional query 112 or join command to join more than two tables in the plurality of tables 104, 106, 108 to create and output a multi-dimensional join table 110.

The join management system 102 processes the query 112 and the plurality of tables 104, 106, 108 to analyze and parse the query 112 using the query parser module 128. In an implementation, the query parser module 128 extracts query data from the query 112, with the extracted data including structural data corresponding to the structure of the query 112. In addition, the query parser module 128 extracts query data from the query 112, with the extracted data including join conditions. Also, the query parser module 128 extracts query data from the query 112, with the extracted data including join keys. Further, the query parser module 128 extracts query data from the query 112, with the extracted data including at least one predicate in the query 112. The query normalization module 130 determines whether the query 112 has a normalized query structure. If the query 112 already has a normalized query structure, the query normalization module 130 passes the query 112 to the query hash module 132 to process the query 112 as described below. Otherwise, if the query 112 does not have a normalized query structure, the query normalization module 130 normalizes the query 112, and the normalized query is passed to the query hash module 132.

In an implementation consistent with the invention, a method or procedure performs normalization of queries by utilizing rule-based formatting, tokenization, abstract syntax tree (AST) parsing, and clause sorting to standardize keyword and identifier casing, to remove redundant whitespace, and to restructure clauses. The method or procedure is a software-based method for automated normalization of SQL queries. In one implementation, the software method includes the known PYSPARK method. In another implementation, the software method includes the known American National Standards Institute (ANSI) SQL method. In a further implementation, the software method includes the known SNOWFLAKE SQL method.

For example, a raw query 112 such as:

SELECT * FROM customers WHERE status='active' and name='Jane Doe' is normalized to:

SELECT * FROM customers WHERE name='Jane Doe' AND status='active'.

The join management system 102 applies dialect-specific processing to improve query comparison, readability, and processing efficiency across diverse data platforms. The query hash module 132 generates a unique hash value for each query 112 using the normalized query structure, and the extracted query data, including the structure of the query 112, join keys, join conditions, and predicates to identify recurring queries and query patterns. For example, the query hash module 132 performs a hash function:

(JOIN orders customers ON cust_id WHERE date>2025 Jan. 1)→hash 123456789 in which an example query 112 is "JOIN orders customers ON cust_id WHERE date>2025 Jan. 1" and the output hash value is "123456789".

The hash value, such as "123456789" in the example above, is associated with the query 112. In one implementation, the query hash module 132 computes a deterministic hash to generate a hash value for each query 112 over a plurality of queries over time to identify a recurring pattern in the plurality of queries. In another implementation, the query hash module 132 computes a deterministic hash from the query 112 and from at least one query stored in the query history storage 124 to identify a recurring pattern in the plurality of queries including the query 112 and the stored at least one query. The query history storage 124 also stores, maintains, and tracks a persistent history of query executions to inform future optimizations.

In one implementation, the query history storage 124 stores an identification of the query 112 and stores the hash value associated with the query 112. In another implementation, implementation, the query history storage 124 stores query metadata including at least one of an identification of the hash function, the extracted query data, the query frequency, the query selectivity, the query execution time, a shuffle byte of each query 112, and a chosen strategy for performing the query The extracted query data includes the structure of the query 112, join conditions, join keys, and at least one predicate. For example, the query history storage 124 stores the history of query executions and the query metadata in a DELTA LAKE based table, publicly available from DATABRICKS, INC., for persistent, scalable access. In another example, the query history storage 124 stores the history of query executions and the query metadata in any known table storage structure, dataset storage structure, or database storage structure. In a further example, the query history storage 124 stores any query patterns identified from the at least one query 112 and optionally any stored queries. In an implementation, the query hash module 132 uses the publicly available MURMURHASH3 hash function, which is a non-cryptographic hash function (NCHF) to generate the hash value associated with the query 112. In another implementation, the query hash module 132 uses any known hash function to generate the hash value associated with the query 112.

In an implementation consistent with the invention, the execution plan cache 126 is a key-value store which maps query hashes to optimized execution plans with associated Bloom filter configurations, with each Bloom filter configuration specifying a Bloom filter and corresponding to a cached optimized execution plan. The execution plan cache 126 indexes the optimized execution plans and associated Bloom filter configuration by the corresponding query hash values. In one implementation, the execution plan cache 126 is a distributed cache to reduce planning overhead.

In one implementation, the distributed key-value store is the REMOTE DICTIONARY SERVER (REDIS) publicly available from REDIS LTD. In another implementation, the distributed key-value store is the APACHE IGNITE distributed database management system publicly available from APACHE SOFTWARE FOUNDATION. The execution plan cache 126 stores a plurality of execution plans and a plurality of hash values, with each execution plan associated with a hash value. An execution plan is a detailed roadmap that outlines how a data management system, such as a database management system (DBMS), retrieves and processes data to execute a query 112, to determine query performance, to optimize operations on tables databases, and datasets. In one implementation, an execution plan is generated by a query optimizer, which evaluates multiple strategies to determine the most efficient way to execute a query 112. For example, the query optimizer is implemented by an optimization technique known in the art. In another implementation, an execution plan is generated by a user using the input/output device 120. In an implementation, the cached execution plans are SPARK-based execution plans.

Figure 3:
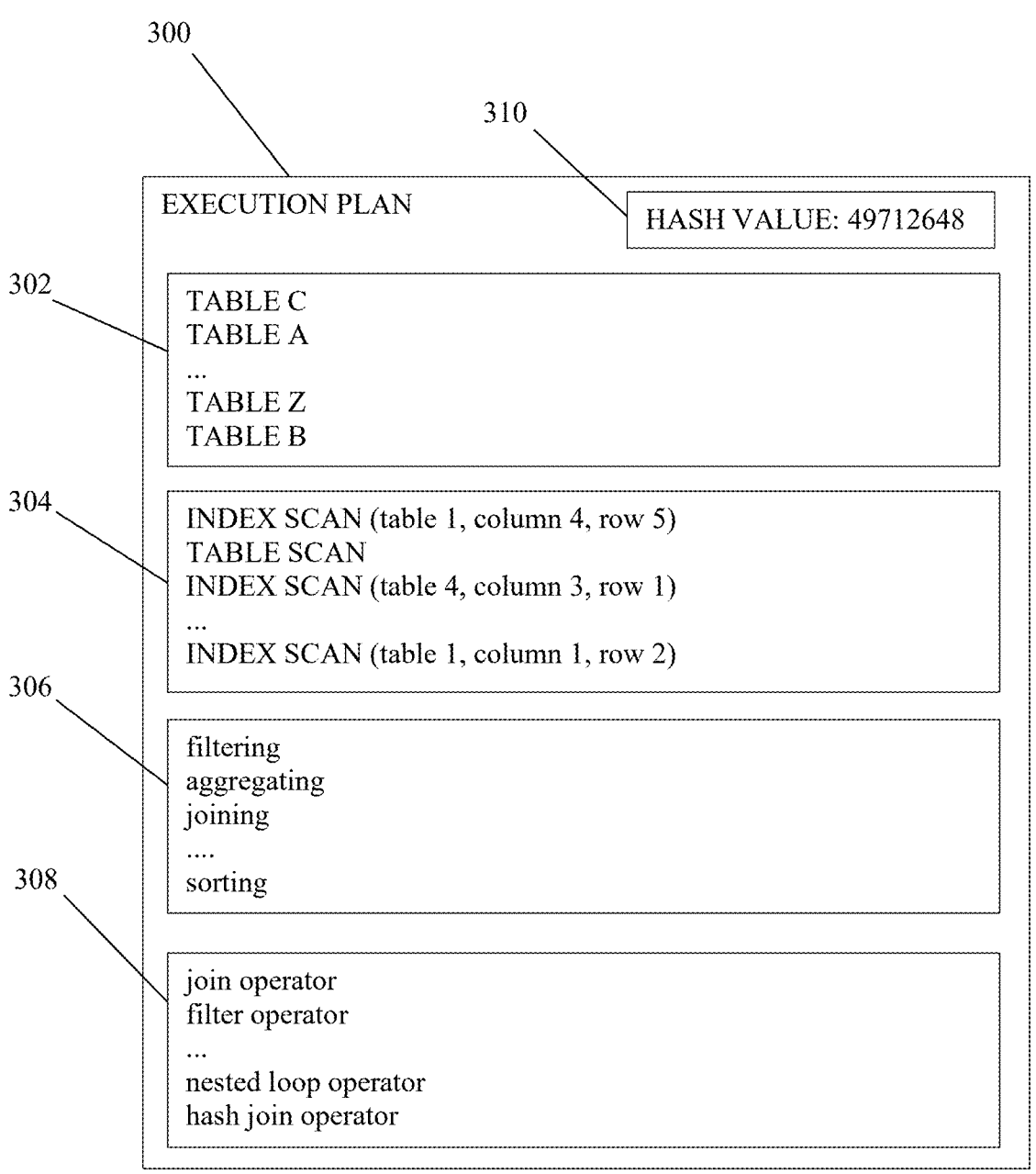
FIG. 3 is an example execution plan used in the implementation of FIG. 1.

As shown in FIG. 3, an example execution plan 300 includes an access order 302 of tables, an access method 304, an operation 306 to be performed on data in at least one table, at least one operator 308, such as a logical operator or a physical operator, and a hash value 310 associated with the execution plan 300. The access order 302 specifies the sequence in which tables are accessed during processing of the execution plan 300. For example, if a query 112 involves multiple tables, the query optimizer decides whether to access a first specified table followed by a second specified table, etc. As shown in the example execution plan 300, the access order 302 indicates that Table C is accessed first, followed by Table A, followed by other tables, followed by Table Z, and finally by Table B, with the tables A, B, C, . . . . Z corresponding to a subset of the plurality of tables 104, 106, 108 as well as other tables accessible by the execution plan 300.

The access method 304 is at least one method which details how data is retrieved from each of the tables accessible by the execution plan 300. For example, the at least one method includes an index scan which is used when specific rows are needed from a given table based on indexed columns. In another example, the at least one method includes a table scan, which reads all of the rows in a given table. Table scans are often used for small tables or when no suitable index exists. In a further example, the access method 304 includes any other known types of access methods. The operation 306 specifies at least one operation to be performed on data in at least one table. For example, the at least one operation includes a filtering operation or command such as a WHERE clause or keyword, a sorting operation or command such as an ORDER BY clause or keywords, an aggregating operation or command such as a GROUP BY clause or key words, and a joining tables operation or command such as a JOIN clause or keyword. In one implementation such operations are optimized to minimize resource usage during execution.

In an implementation consistent with the invention, the at least one operator 308 includes a logical operator, such as a join operator or a filter operator, with the logical operator representing a high-level operation. In another implementation, the at least one operator 308 includes a physical operator, such as a nested loop operator or a hash join operator, which performs an actual implementation of an operation. In addition, the execution plan 300 includes a field storing a hash value 310 associated with the execution plan 300, such as the example hash value "49712648" associated with and corresponding to the execution plan 300. The query hash module 132 uses the hash values stored in the query history storage 124 to search for any corresponding cached execution plans stored in the execution plan cache 126 matching a specific hash of a specific execution plan stored in the execution plan cache 126.

The join optimizer module 134 determines an execution plan to be used, and once an execution plan is determined, performs the join operation on the plurality of tables 104, 106, 108 according to the determined execution plan, including applying a filter to reduce shuffling. The optimization module 140 executes a predetermined optimization technique to a predetermined execution plan stored in the execution plan cache 126. In one implementation, the predetermined optimization technique is the Adaptive Query Execution (AQE) technique publicly available from the APACHE SOFTWARE FOUNDATION for use in the SPARK open-source unified analytics engine publicly available from the APACHE SOFTWARE FOUNDATION. AQE uses the runtime statistics to choose the most efficient query execution plan. The predetermined execution plan is an AQE-based execution plan. In another implementation, the predetermined optimization technique is any known optimization technique to optimize a join operation of tables.

Prior to determining the execution plan to be used on the query 112 having the associated hash value, the join optimizer module 134 searches the execution plan cache 126 for any cached Bloom filter-based execution plan having an associated hash value matching the hash value of the query 112. If a matching hash value is found, the join optimizer module 134 uses a cached Bloom filter-based execution plan having the hash value matching the hash value of the query 112, and so the join optimizer module 134 reuses the matching cached Bloom filter-based execution plan and the associated Bloom filter configuration stored in the execution plan cache 126. The join optimizer module 134 applies the matching cached Bloom filter-based execution plan to the query 112 to generate and collect baseline metrics, as described below.

However, if no matching hash value is found, the join optimizer 134 executes the query 112 using the AQE-based execution plan, and in the execution, generates and collects baseline metrics. In one implementation, the baseline metrics include shuffle bytes used in executing the query 112. In another implementation, the baseline metrics include the execution time of the execution of the query 112. In a further implementation, the baseline metrics include the memory usage used in executing the query 112. In an additional implementation, the baseline metrics include any known metrics determined when executing the query 112. The collected baseline metrics from execution of the AQE-based execution plan are stored, for example, in the query history storage 124. In another example, the collected baseline metrics are stored in the join optimizer module 134.

In addition, if no matching hash value is found, the Bloom filter manager module 136 dynamically constructs and tunes a new Bloom filter for executing the query 112 based on the historical query data and data statistics stored in the query history storage 124. In one implementation, the historical query data includes historical query patterns. In another implementation, the data statistics include the query frequency. Unlike known Bloom filters which are static Bloom filters or runtime-optimized Bloom filters, in an implementation consistent with the invention, the Bloom filter manager module 136 uses historical query patterns, including query frequency patterns and selectivity patterns, to tune the dynamically constructed Bloom filter.

In one implementation, the Bloom filter manager module 136 estimates join selectivity and cardinality using approximate distinct counts determined by the SPARK open-source unified analytics engine. In another implementation, the Bloom filter manager module 136 estimates join selectivity from a ratio of matching join keys. The Bloom filter manager module 136 determines Bloom filter parameters using predetermined algorithms. For a Bloom filter, a false positive rate $P_f$:

$$P_f = \left(1 - e^{\frac{-kn}{m}}\right)^k$$

in which k is the number of hash functions, n is the number of elements inserted into the Bloom filter, m is the size of the bit array of the Bloom filter, and e=Euler's number.

For a fraction of bits set to 1, after inserting elements into the Bloom filter, the probability that a specific bit is still 0 is approximately:

$$\left(1 - \frac{1}{m}\right)^{kn} \approx e^{\frac{-kn}{m}}.$$

Thus, the probability that a bit is 1 is 1−. For the false positive rate, when checking membership, all k hash functions must point to bits that are 1. The probability of all k hash functions pointing to bits that are 1, for an element not in the set is:

$$P_f = \left(1 - e^{\frac{-kn}{m}}\right)^k$$

In an implementation, to optimize the false positive rate $P_f$, the false positive rate $P_f$ is minimized such that the optimal number of hash functions k is:

$$k = \frac{m}{n}\ln(2)$$

which ensures a balance between space efficiency and accuracy.

In an implementation consistent with the invention, the Bloom filter parameters determined by and stored in the Bloom filter manager module 136 using predetermined Bloom filter parameter rules. For example, the Bloom filter manager module 136 determines the number of bits m in a dynamically constructed Bloom filter according to:

$$m = \frac{-n \cdot lnp}{(\ln2)^2}$$

in which:
    m=the number of bits in the Bloom filter;
    n=the expected number of inserted elements;
    p=a preset and desired false positive rate; and
    ln( ) is the natural logarithm function.

In one implementation, each of the number of bits m, the expected number of inserted elements n, and the preset and desired false positive rate p is a default value determined when the join management system 102 is initially configured. In another implementation, each of the number of bits m, the expected number of inserted elements n, and the preset and desired false positive rate p is set by a system administrator inputting data and commands in the input/output device 120. Using such parameters, the Bloom filter manager module 136 adjusts and tunes the dynamically constructed Bloom filter by frequency and selectivity, for example, for a larger size of Bloom filter; for larger sizes of tables 104, 106, 108; and for frequent queries.

The Bloom filter manager module 136 then tunes the determined Bloom filter parameters of the constructed Bloom filter. In one implementation, the Bloom filter parameters include the size of the bit array of the Bloom filter and the number of hash functions, based on query history such as frequency and selectivity, which are stored in the query history database 124. In another implementation, the Bloom filter parameters include data characteristics such as cardinality, which are stored in the query history database 124. The Bloom filter manager module 136 generates a Bloom-based execution plan from the dynamically constructed and tuned Bloom filter parameters and Bloom filter configuration data.

The join optimizer 134 executes the query 112 using the Bloom filter-based execution plan, and in the execution, generates and collects baseline metrics, and performs filtering of non-matching rows before a join. In one implementation, the baseline metrics include shuffle bytes used in executing the query 112. In another implementation, the baseline metrics include the execution time of the execution of the query 112. In a further implementation, the baseline metrics include the memory usage used in executing the query 112. In an additional implementation, the baseline metrics include any known metrics determined when executing the query 112. The collected baseline metrics from execution of the query 112 by the Bloom filter are stored, for example, in the query history storage 124. In another example, the collected baseline metrics are stored in the join optimizer module 134.

The benchmarking module 138 measures performance metrics from the execution of the AQE-based execution plan and the Bloom filter-based execution plan to compare strategies in such executions. In one implementation, the performance metrics include the planning time of each execution plan. In another implementation, the performance metrics include the execution time of each execution plan. In an additional implementation, the performance metrics include the shuffle bytes of each execution plan. In a further implementation, the performance metrics include the memory usage of each execution plan. In still another implementation, the performance metrics include any known metrics measuring the performance of the execution plans. Upon collecting the performance metrics of each execution plan, the benchmarking module 138 does a performance comparison between the AQE-based execution plan and the Bloom filter execution plan.

In an implementation consistent with the invention, the benchmarking module 138 does the performance comparison by calculating a weighted score of each of the performance metrics of each execution plan. For example, the weighted score is determined from 50% of the value of the shuffle bytes, 30% of the value of the execution time, and 20% of the value of the memory usage. In another example, the weighted score is determined by other weights of the value of the shuffle bytes, execution time, planning time, memory usage, and any other collected performance metrics of the AQE-based execution plan and the Bloom filter execution plan. In an implementation consistent with the invention, the values of the weights are default values stored in the memory 116. In another implementation, the values of the weights are set from input values entered by a system administrator through the input/output device 120.

As a result of the performance comparison, the scores of each execution plan are compared, and the execution plan with the highest weighted score is considered the better or optimal execution plan. The better or optimal execution plan is selected for performing the join of the tables 104, 106, 108 to generate and output the joined table 110. The join management system 102 implements a performance-driven strategy selection for optimally joining the tables 104, 106, 108 to generate and output the joined table 110.

If the dynamically constructed Bloom filter-based execution plan is selected, the dynamically constructed Bloom filter-based execution plan and the associated Bloom filter configuration data are cached in the execution plan cache 126. The query history storage 124 is updated with the selected dynamically constructed Bloom filter-based execution plan and associated performance metrics.

For either of the dynamically constructed Bloom filter-based execution plan and the AQE-based execution plan, the selected execution plan is executed across computer systems having such tables 104, 106, 108 to be joined. Based on the performance comparison of the execution plans, the selected execution plan has improved computer functionality to join the tables 104, 106, 108 to generate and output the joined table 110. In one implementation, the selected execution plan improves computer functionality by minimizing or optimizing data shuffling associated with joining the tables 104, 106, 108 to generate and output the joined table 110. In another implementation, the selected execution plan improves computer functionality by minimizing or optimizing the memory usage associated with joining the tables 104, 106, 108 to generate and output the joined table 110. In a further implementation, the selected execution plan improves computer functionality by minimizing or optimizing execution time associated with joining the tables 104, 106, 108 to generate and output the joined table 110. In still another implementation, the selected execution plan improves computer functionality by minimizing or optimizing any known performance metric associated with joining the tables 104, 106, 108 to generate and output the joined table 110.

In one implementation, the selected execution plan is executed across computer systems in a SPARK-based cluster to join the tables 104, 106, 108 to generate and output the joined table 110. In another implementation, the selected execution plan is executed across distributed data processing systems to join the tables 104, 106, 108 to generate and output the joined table 110.

Figure 4A:
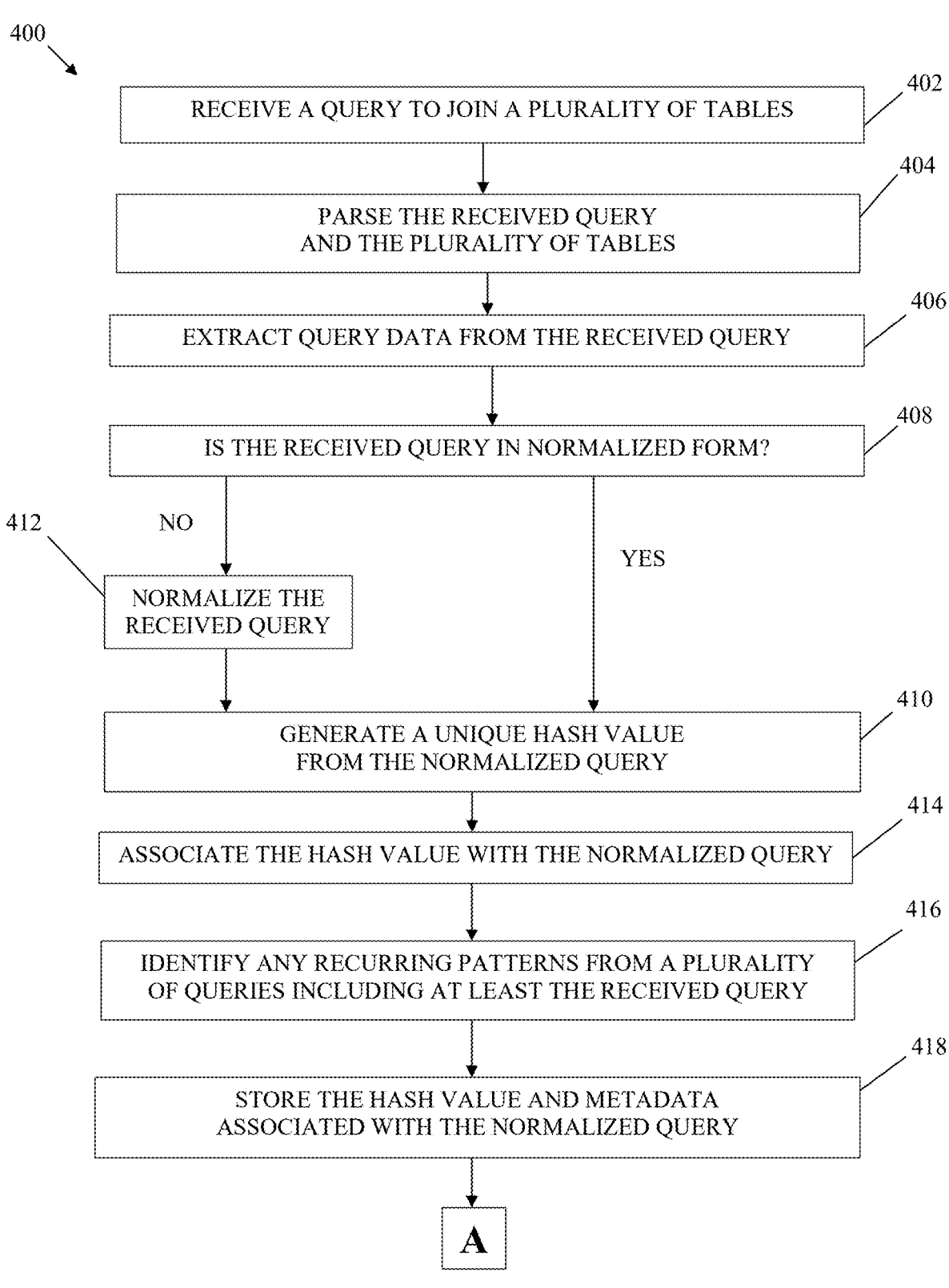
FIGS. 4A-4C are flowcharts of operation of a method implementing the join management system of FIG. 1.
Figure 4B:
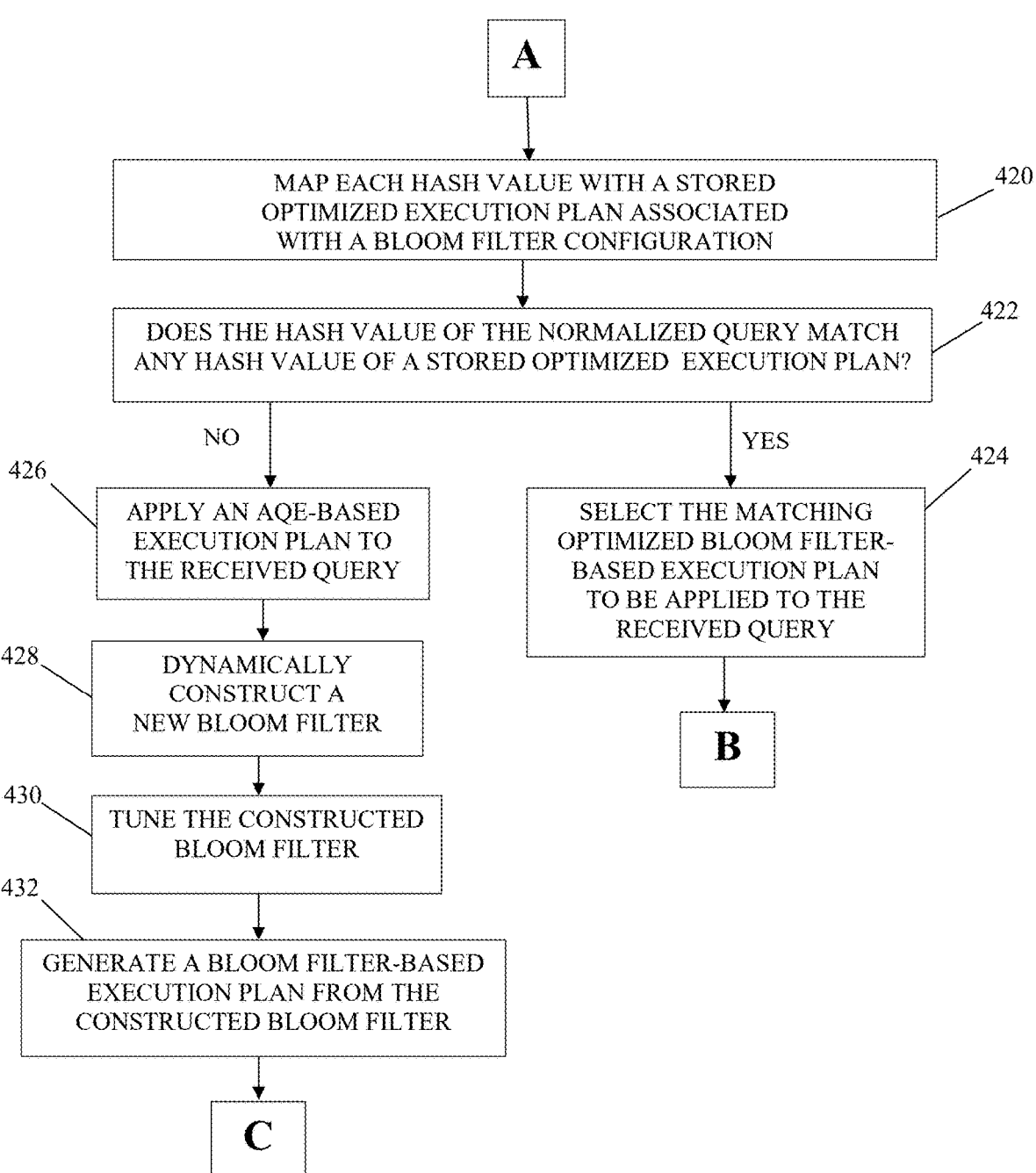
Figure 4C:
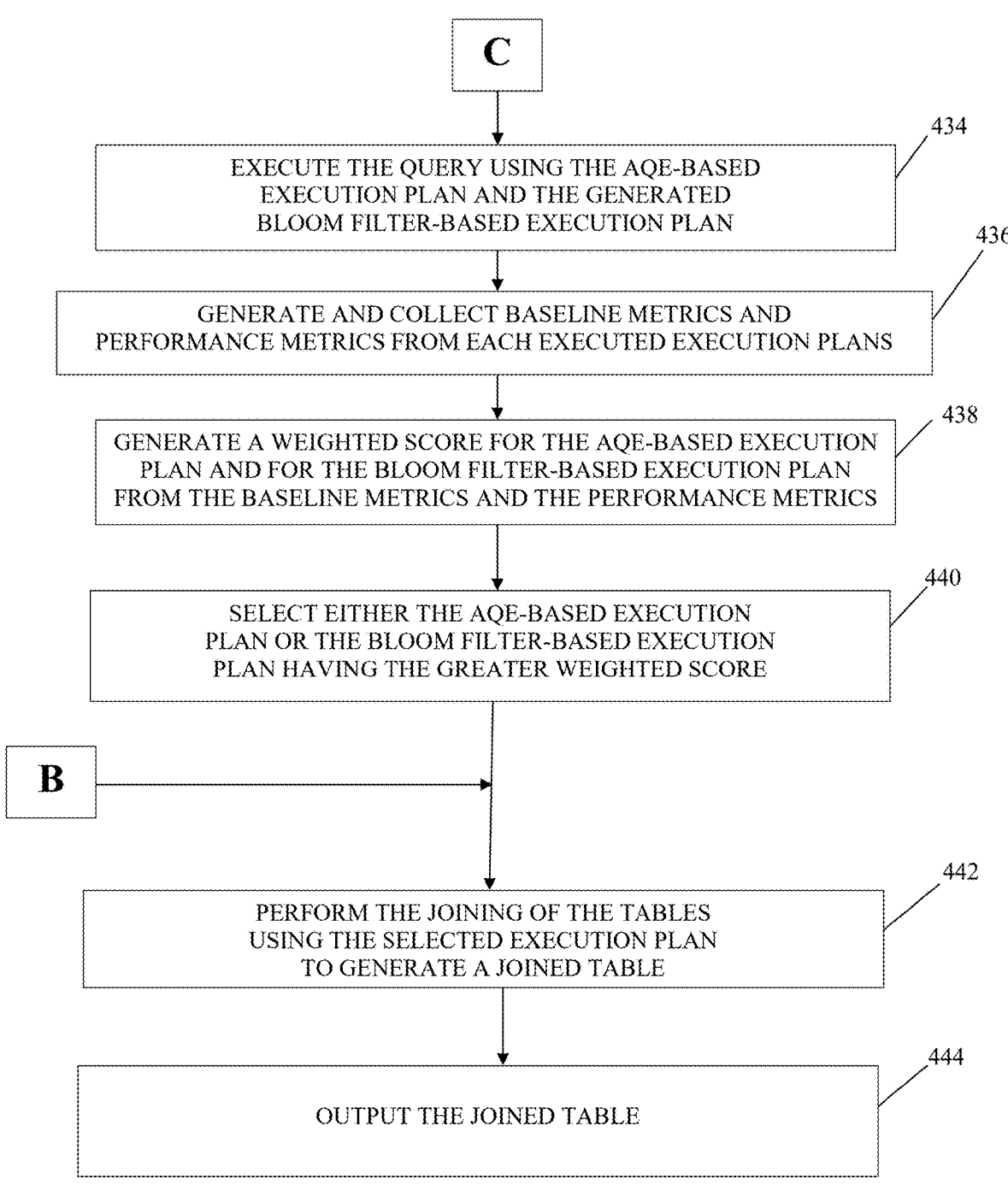

Referring to FIGS. 4A-4C, a computer-based method 400 includes receiving a query to join a plurality of tables in step 402, parsing the received query and the plurality of tables in step 404, extracting query data from the received query in step 406, and determining whether the received query in normalized form in step 408. In one implementation, if the received query is already in normalized form as determined in step 408, the method 400 generates a unique hash value from the normalized query in step 410. In another implementation, if the received query is already in normalized form as determined in step 408, the method 400 generates a unique hash value from the normalized query as well as the extracted query data includes the structure of the query 112, join conditions, join keys, and at least one predicate in step 410. However, in one implementation, if the received query is not in normalized form as determined in step 408, the method 400 normalizes the received query in step 412 and proceeds to step 410 to generate a unique hash value from the normalized query. In another implementation, if the received query is not in normalized form as determined in step 408, the method 400 normalizes the received query in step 412, and proceeds to step 410 to generate a unique hash value from the normalized query as well as the extracted query data includes the structure of the query 112, join conditions, join keys, and at least one predicate in step 410.

The method 400 associates the hash value with the normalized query in step 414, identifies any recurring patterns from a plurality of queries including at least the received query in step 416, with the plurality of queries stored in the query history storage 124. The method 400 stores the hash value and metadata associated with the normalized query in step 418, and maps each hash value with a stored optimized execution plan associated with a Bloom filter configuration in step 420. The execution plan cache 126 stores at least one optimized execution plan. The method 400 determines whether the hash value of the normalized query matches any hash value of a stored optimized execution plan in step 422. If the hash value of the normalized query matches any hash value of a stored optimized execution plan in step 422, the method 400 selects the matching optimized bloom filter-based execution plan to be applied to the received query in step 424, and proceeds to step 442. However, if the hash value of the normalized query does not match any hash value of a stored optimized execution plan in step 422, the method 400 applies an AQE-based execution plan to the received query in step 426, dynamically constructs a new Bloom filter in step 428, tunes the constructed bloom filter in step 430, generates a Bloom filter-based execution plan from the constructed Bloom filter in step 432, and proceeds to step 434. In step 434, the method 400 executes the query using the AQE-based execution plan and the generated Bloom filter-based execution plan, and the method 400 generates and collects baseline metrics and performance metrics from each executed execution plan in step 436.

The method 400 generates a weighted score for the AQE-based execution plan and for the Bloom filter-based execution plan from the baseline metrics and the performance metrics in step 438 using the benchmarking module 138. The method 400 selects either the AQE-based execution plan or the Bloom filter-based execution plan having the greater weighted score in step 440. For example, if the Bloom filter-based execution plan has a weighted score greater than the weighted score of the AQE-based execution plan, the Bloom filter-based execution plan is selected in step 440 by the benchmarking module 138. In another example, if the AQE-based execution plan has a weighted score greater than the weighted score of the Bloom filter-based execution plan, the AQE-based execution plan is selected in step 440 by the benchmarking module 138. In an implementation consistent with the invention, a greater weighted score represents a better or optimal execution plan for joining the tables 104, 106, 108 to generate the joined table 110. In an alternative implementation consistent with the invention, a lesser weighted score represents a better or optimal execution plan for joining the tables 104, 106, 108 to generate the joined table 110. For example, an execution plan implemented with less execution time, less memory capacity, or less shuffle memory, and such performance factors contribute to determining a better or optimal execution plan for joining the tables 104, 106, 108.

Figure 5:
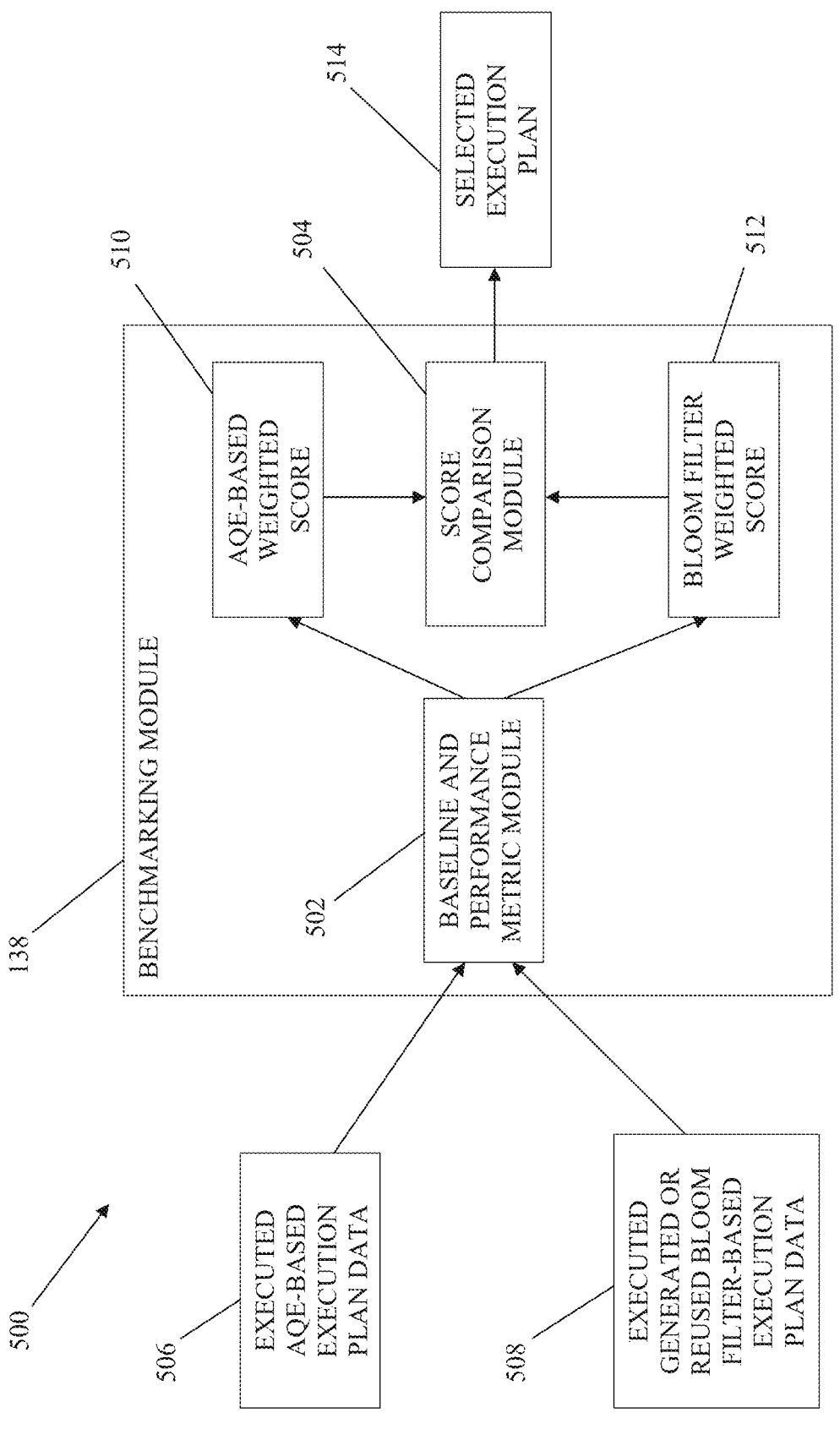
FIG. 5 is a schematic illustrating selection of an execution plan in the implementation of FIG. 1.

Referring to FIGS. 4-5, a schematic 500 illustrates the flow of data processed by the benchmarking module 138, which includes a baseline and performance metric module 502 and a score comparison module 504. As the AQE-based execution plan is executed to determine AQE-based execution plan data 506 and the generated Bloom filter-based execution plan is executed to determine Bloom filter-based execution plan data 508, respectively, in step 434. The baseline and performance metric module 502 determines the baseline metrics and the performance metrics from the AQE-based execution plan data 506 and from the Bloom filter-based execution plan data 508, as in step 436, and generates an AQE-based weighted score 510 and a Bloom filter-based weighted score 512, respectively. The baseline and performance metric module 502 uses a predetermined weighting rule which assigns a weighted score to the performance of the execution plan which optimizes the performance of the execution plan. In one implementation, the predetermined weighting rule is a default rule determined when the join management system 102 and the benchmarking module 138 are initially configured. In another implementation, the predetermined weighting rule is set by a system administrator inputting data and commands in the input/output device 120.

For example, in one implementation, the Bloom filter-based execution plan requires a 5 MB shuffle during execution, and the AQE-based execution plan requires a 5.5 MB shuffle. In such an example, using the predetermined weighting rule, the baseline and performance metric module 502 determines the Bloom filter-based weighted score 512 to be 500, and the AQE-based weighted score 510 is determined to be 400, since a lower shuffle memory capacity optimizes the execution of the corresponding execution plan, and so the execution plan with the optimal shuffle memory capacity receives a greater weighted score, such as 900 and 800, respectively.

The score comparison module 504 compares the AQE-based weighted score 510 and the Bloom filter-based weighted score 512, and determines the greater of the AQE-based weighted score 510 and the Bloom filter-based weighted score 512. In one implementation, the score comparison module 504 includes an electronic comparator device known in the art for comparing signals corresponding to the AQE-based weighted score 510 and the Bloom filter-based weighted score 512 to determine the greater of the AQE-based weighted score 510 and the Bloom filter-based weighted score 512. In another implementation, the score comparison module 504 uses an IF-THEN statement implemented and executed in software to determine the greater of the AQE-based weighted score 510 and the Bloom filter-based weighted score 512. In a further implementation, the score comparison module 504 uses any known comparison mechanism to determine the greater of the AQE-based weighted score 510 and the Bloom filter-based weighted score 512.

In the example above, for the Bloom filter-based weighted score 512 of 900, and the AQE-based weighted score 510 of 800, the score comparison module 504 determines that the value 900 is greater than the value 800, and so the score comparison module 504 selects the Bloom filter-based execution plan instead of the AQE-based execution plan in step 440 in FIG. 4. The score comparison module 504 sets the Bloom filter-based execution plan to be the selected execution plan 514 in FIG. 5.

In one implementation, in the case that the Bloom filter-based weighted score 512 is numerically equal to the AQE-based weighted score 510, the score comparison module 504 selects the Bloom filter-based execution plan as the selected execution plan 514. In another implementation, in the case that the Bloom filter-based weighted score 512 is numerically equal to the AQE-based weighted score 510, the score comparison module 504 selects the AQE-based execution plan as the selected execution plan 514.

In one implementation, the score comparison module 504 is configured to default to selecting the Bloom filter-based execution plan as the selected execution plan 514 when the Bloom filter-based weighted score 512 is numerically equal to the AQE-based weighted score 510. In another implementation, the score comparison module 504 is configured by a system administrator inputting data and commands in the input/output device 120 to selecting the Bloom filter-based execution plan as the selected execution plan 514 when the Bloom filter-based weighted score 512 is numerically equal to the AQE-based weighted score 510. In a further implementation, in the rare event that the Bloom filter-based weighted score 512 is numerically equal to the AQE-based weighted score 510, which is especially rare when joining large data sets in distributed computing, the score comparison module 504 selects either of Bloom filter-based execution plan or the AQE-based execution plan as the selected execution plan 514.

In an additional implementation, when the Bloom filter-based weighted score 512 is numerically equal to the AQE-based weighted score 510, the benchmarking module 138 generates and outputs a notification to a user such as a system administrator through the input/output device 120. The notification warns the user or system administrator that the Bloom filter-based weighted score 512 is numerically equal to the AQE-based weighted score 510. In one implementation, in response to the notification of such an equality situation, the user or system administrator uses the input/output device 120 to change the predetermined weighting rule to re-process the baseline metrics and the performance metrics from the AQE-based execution plan data 506 and from the Bloom filter-based execution plan data 508 to re-calculate the weighted scores of each execution plan for performing the score comparison by the score comparison module 504. In another implementation, in response to the notification of such an equality situation, the user or system administrator uses the input/output device 120 to manually select the AQE-based execution plan or the Bloom filter-based execution plan as the selected execution plan 514.

Referring back to FIG. 4, the method 400 performs the joining of the tables 104, 106, 108 using the join optimizer module 134 applying the selected execution plan 514 to generate the joined table 110 in step 442, and the join management system 102 outputs the joined table 110 in step 444. In one implementation, the join management system 102 outputs the joined table 110 to the memory 116. In another implementation, the join management system 102 outputs the joined table 110 externally to another system or database. For example, the join management system 102 is operatively connected to the other system or database, and the join management system 102 transmits the joined table 110 to the other system or database. In another example, the join management system 102 is operatively connected to the other system or database through a network, and the join management system 102 transmits the joined table 110 to the other system or database through the network.

In an implementation consistent with the invention, a non-transitory computer-readable storage medium stores instructions executable by a processor to join a plurality of initial tables 104, 106, 108. The instructions include store at least one unique Bloom filter-based hash value including a unique first Bloom filter-based hash value; store an Adaptive Query Execution (AQE) based execution plan and at least one Bloom filter-based execution plan including a first Bloom filter-based execution plan, wherein each at least one Bloom filter-based execution plan is associated with a respective stored at least one unique Bloom filter-based hash value and the first Bloom filter-based execution plan is associated with the unique first Bloom filter-based hash value; receive a query to join the plurality of initial tables; generate a unique query-based hash value from the query; determine a case that the unique query-based hash value matches the unique first Bloom filter-based hash value from among the at least one unique Bloom filter-based hash value; and in the case that the unique query-based hash value matches the unique first Bloom filter-based hash value associated with the first Bloom filter-based execution plan, select the first Bloom filter-based execution plan as a selected execution plan. In the case that the unique query-based hash value does not match any unique Bloom filter-based hash value, the instructions include construct a new Bloom filter; generate a new Bloom filter-based execution plan corresponding to the generated new Bloom filter; execute the AQE-based execution plan; execute the new Bloom filter-based execution plan; collect a metric for the executed AQE-based execution plan and for the executed new Bloom filter-based execution plan; generate a pair of scores from the metric for each of the executed AQE-based execution plan and the executed new Bloom filter-based execution plan; determine a greater score from among the generated pair of scores; and select from the executed AQE-based execution plan and the executed new Bloom filter-based execution plan with the greater score to be the selected execution plan. The instructions further include execute the selected execution plan to join the plurality of initial tables to generate the joined table; and output the joined table.

In operation, the system 100 and the method 400 optimize large-scale table joins in distributed data processing systems by integrating query history, hash-based execution plan reuse, and dynamic Bloom filter tuning with a performance-driven mechanism to select an optimal strategy for performing the large-scale table joins. The system 100 and the method 400 are estimated to achieve significant performance improvements, such as 30%-50% reduction in shuffle bytes saving both memory and faster executions, and up to 50%-

60% reduction in planning time. The system 100 and the method are particularly suited for distributed environments using the SPARK open-source unified analytics engine publicly available from the APACHE SOFTWARE FOUNDATION as well as applications publicly available from SNOWFLAKE, INC., to enhance scalability and efficiency in big data analytics.

In an example for a SCALA-based implementation in SPARK which demonstrates the efficacy of the functioning and advantages of the system 100 and the method 400 consistent with the invention, an example dataset includes two tables with one million rows of orders, and 100,000 rows of customers, with a join on customer identifications with the parameter cust_id. For the query 112:

SELECT * FROM orders JOIN customers ON orders.cust_id=customers.cust_id WHERE orders. date>"2025 Jan. 1")

an example Bloom filter-based execution plan is generated for a dynamically constructed and tuned example Bloom Filter.

The Bloom filter-based execution plan performs with a planning time of 150 ms, a reuse time of 50 ms, an execution time of 2,000 ms, and using 5 MB shuffle bytes with 8 MB of memory usage. In comparison, an example AQE-based execution plan has a planning time of 120 ms, an execution time of 2,200 ms, and using 5.5 MB shuffle bytes with 8.5 MB of memory usage. Also, an example static Bloom filter-based execution plan has a planning time of 120 ms, an execution time of 2,400 ms, and using 6 MB shuffle bytes with 8.5 MB of memory usage, while an example execution plan without an associated Bloom filter has a planning time of 100 ms, an execution time of 3,000 ms, and using 8 MB shuffle bytes with 9 MB of memory usage.

In the comparison of performances of the above execution plans, the system 100 and the method 400 have a 66% planning time reduction on reuse of execution plans, with one planning time of 50 ms vs. another planning time of 150 ms. The execution time of the system 100 and the method 400 was reduced by 20% to 33% compared to static Bloom joins and no-Bloom joins, and a shuffle byte reduction of 16%-37% was attained due to adaptive filtering.

To be integrated with other platforms, the system 100 and the method 400 use a DELTA LAKE based table, publicly available from DATABRICKS, INC., for query history storage and supports SPARK-BASED CATALYST optimizer, with potential for SNOWFLAKE-based streams integration.

The system 100 and the method 400 are advantageous over known Bloom filter implementations, since the system 100 and the method 400 employ query history-driven Bloom filter tuning using historical query patterns including frequency and selectivity to tune the constructed Bloom filters, unlike known static Bloom filters and known runtime-optimized filters such as known compressed bloom filter joins. The system 100 and the method 400 are also advantageous over known systems and methods by employing hash-based execution plan reuse, since known systems instead cache datasets instead of execution plans associated with Bloom filters, and the known AQE-based systems and methods do not use query hashing for reuse.

The system 100 and the method 400 are further advantageous over known systems and methods by employing performance-driven AQE comparison, since the dynamic selection of Bloom filter-based execution plans or AQE-based execution plans by the system 100 and the method 400 is based on performance scores is unique compared to known systems and methods such as known hierarchical interleaved Bloom filters (HIBF). The system 100 and the method 400 are additionally advantageous in employing distributed join optimization, with the focus on large-scale joins with history-driven optimization, which differentiates system 100 and the method 400 from known domain-specific solutions such as the use of HIBF for bioinformatics.

Moreover, the system 100 and the method 400 are additionally advantageous by combining query history, hashing, adaptive Bloom filters, and AQE comparison to provide a technical solution to the technical problems and challenges of performing joins in distributed system hampered by shuffle overhead. In addition, the system 100 and the method 400 perform benchmarking which attains a shuffle reduction of 20%-37% and a planning time savings of 66% planning time savings, validated in SPARK and demonstrating significant improvements over AQE and static Bloom Filter approaches. Further, the system 100 and the method 400 integrates the use of historical patterns with performance-driven strategy selection by selecting optimal execution plans, while known systems and methods focus on runtime-only techniques using AQE or static optimizations.

The system 100 and the method 400 also attain memory efficiency due to dynamic Bloom filter tuning which minimizes memory usage such as a reduction of 5%-11% in memory usage. The system 100 and the method 400 supports scalability to join large datasets such as over 100 million rows in distributed processing systems such as SPARK and SNOWFLAKE. The system 100 and the method 400 are also adaptable by performing history-driven optimization which adapts to recurring query patterns, and outperforming known static approaches or known runtime-only approaches. In addition, the system 100 and the method 400 enhance operation of big data platforms, enabling licensing or product differentiation in an over $100 billion market in commercial value.

In another example use case, in a retail database with orders in 100 million rows, and 100 million columns with the parameters order_id, cust_id, date, and amount; and with customers with 10 million rows and 10 million columns with the parameters cust_id, name, and region. For a query 112 such as:

SELECT * FROM orders JOIN customers ON orders.cust_id=customers.cust_id WHERE orders. date>'2025 Jan. 1' the system 100 and the method 400 retrieve a historical frequency such as 5 executions, and selectivity of, for example, 0.05.

The system 100 and the method 400 construct a Bloom filter for customers.cust_id with, for example, a size of 1 MB size and three hash functions. A Bloom filter execution plan is generated for the constructed Bloom filter has a 5 MB shuffle against the AQE execution plan with a 5.5 MB shuffle, and so the system 100 and the method 400 select the Bloom filter execution plan, which is used to execute the join of the tables in the query, reducing shuffle by 20% and reducing planning time by 66% on reuse. The system 100 and the method 400 also update the query history stored in the query history storage 124 with the determined metrics and the selected strategy and execution plan.

The system 100 and the method 400 also generate dynamic and query adaptive Bloom filters which automatically analyze SPARK or any other similar distributed processing engine logs to identify costly operations by parsing the logs, such as executor logs or event logs, to detect patterns including high shuffle costs, excessive disk I/O, or skewed joins, and then tailor and construct a dynamic Bloom filter, for example, adjusting size or hash functions based on log-derived insights, which facilitates solving a real-world technical problem of optimizing query performance in distributed big data systems.

The system 100 and the method 400 address and resolve a measurable performance bottleneck due to costly joins or costly filters, experienced by known SPARK processing engines and other known distributed processing execution engines. The system 100 and the method 400 also provide a specific improvement in computer functionality in reducing query execution time, lowering resource usage, and other improvements in computer functionality in performing joins of tables and other data structures. The system 100 and the method 400 also provide a practical application in tying the solution for selecting an optimal execution plan for joins of table and other data structures in connection with the SPARK-based architecture to leverage execution logs and to compare with the AQE-based execution plan.

The system 100 and the method 400 decide when to apply a Bloom filter, for example only for joins exceeding a shuffle threshold, and decide how to configure the Bloom filter, for example, by adjusting the size based on log-derived cardinality estimates, which introduces a feedback loop that adapts to workload patterns. The system 100 and the method 400 perform optimal joins compared to known static Bloom filter configurations or AQE's runtime decisions, as well as hierarchical Bloom filters which focus on general data structures or network routing, and performs log-driven optimization in a distributed query engines such as SPARK. Known systems and methods such as dynamic partition Bloom filters and extensible Bloom filters do not involve log analysis for optimization decisions, as in the system 100 and the method 400.

Portions of the methods described herein can be performed by software or firmware in machine readable form on a tangible or non-transitory storage medium. For example, the software or firmware can be in the form of a computer program including computer program code adapted to cause the system to perform various actions described herein when the program is run on a computer or suitable hardware device, and where the computer program can be implemented on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments, implementations, or arrangements.

The terminology used herein is for the purpose of describing particular implementations only and is not intended to limit the invention. As used herein, the singular forms "a", "an", and "the" are intended to include the plural forms as well, unless the context clearly indicates otherwise. It will be further understood that the terms "contains", "containing", "includes", "including", "comprises", and/or "comprising", and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second". Also, the phraseology and terminology used herein is for the purpose of description and should not be regarded as limiting. The use of "including", "comprising", "having", "containing", "involving", and variations thereof herein, is meant to encompass the items listed thereafter and equivalents thereof as well as additional items.

While the disclosure has described several exemplary implementations, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to implementations of the disclosure without departing from the essential scope thereof. Therefore, it is intended that the invention is not limited to the particular implementations disclosed, or to the best mode contemplated for carrying out this invention, but that the invention will include all implementations falling within the scope of the appended claims.

The subject matter described above is provided by way of illustration only and should not be construed as limiting. Various modifications and changes can be made to the subject matter described herein without following the example embodiments, implementations, and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-based join management system, comprising:

a communication interface configured to receive a query to join a plurality of initial tables;

a hardware-based processor; a memory configured to store instructions and configured to provide the instructions to the hardware-based processor, the memory including:

an execution plan cache configured to store an Adaptive Query Execution (AQE) based execution plan and at least one stored Bloom filter-based execution plan including a first stored Bloom filter-based execution plan, wherein each at least one stored Bloom filter-based execution plan is associated with a respective stored unique Bloom filter-based hash value; and a set of modules configured to implement the instructions provided to the hardware-based processor, the set of modules including:

a query hash module configured to generate a unique query-based hash value from the query, to determine the case that the unique query-based hash value matches a unique stored hash value associated with the first stored Bloom filter-based execution plan, and in the case that the unique query-based hash value matches the stored unique Bloom filter-based hash value associated with the first stored Bloom filter-based execution plan, to select the first stored Bloom filter-based execution plan as a selected execution plan;

a Bloom filter manager module configured, responsive to the case of no match of the unique query-based hash value, to construct a new Bloom filter and to generate a new Bloom filter-based execution plan corresponding to the generated new Bloom filter;

a join optimizer module configured to execute the AQE-based execution plan and to execute the new Bloom filter-based execution plan; and a benchmarking module configured, responsive to the case of no match of the unique query-based hash value, to collect a metric for the executed AQE-based execution plan and for the executed new Bloom filter-based execution plan, to generate a pair of scores from the metric for each of the executed AQE-based execution plan and the executed new Bloom filter-based execution plan, to determine a greater score from among the generated pair of scores, and to select from the executed AQE-based execution plan and the executed new Bloom filter-based execution plan with the greater score to be the selected execution plan;

wherein the benchmarking module collects the metric selected from the group consisting of: the number of shuffle bytes, an execution time, and a memory usage of each of the executed AQE-based execution plan and the executed new Bloom filter-based execution plan;

wherein the benchmarking module generates the pair of scores as a pair of weighted scores for each of the executed AQE-based execution plan and the executed new Bloom filter-based execution plan, and wherein the weighted scores are determined from a predetermined weighting rule using weights of 50% for the number of shuffle bytes, 30% for the execution time, and 20% for the memory usage; and wherein the join optimizer module executes the selected execution plan to join the plurality of initial tables to generate and output a joined table.

2. The computer-based join management system of claim 1, wherein the set of modules further comprises:

a query parser module configured to extract query data from the query, wherein the query data is selected from the group consisting of a structure of the query, a join condition, a join key, and a predicate, and wherein the query hash module generates the unique query-based hash value from query and from the extracted query data.

3. The computer-based join management system of claim 1, wherein the set of modules further comprises:

a query normalization module configured to detect a case that the query is in a normalized form, and responsive to the case that the query is not in the normalized form, to normalize the query.

4. The computer-based join management system of claim 1, wherein the plurality of tables is stored in a distributed data processing system.

5. The computer-based join management system of claim 1, wherein the memory further comprises:

a query history storage configured to store historical query data including a plurality of historical query patterns, wherein each historical query pattern includes a query frequency and a join selectivity, and wherein the Bloom filter manager module tunes the new Bloom filter based on parameters using the plurality of historical query patterns.

6. A computer-based method to join a plurality of initial tables, comprising:

storing at least one unique Bloom filter-based hash value including a unique first Bloom filter-based hash value;

storing an Adaptive Query Execution (AQE) based execution plan and at least one Bloom filter-based execution plan including a first Bloom filter-based execution plan, wherein each at least one Bloom filter-based execution plan is associated with a respective stored at least one unique Bloom filter-based hash value and the first Bloom filter-based execution plan is associated with the unique first Bloom filter-based hash value;

receiving a query to join the plurality of initial tables;

generating a unique query-based hash value from the query;

determining a case that the unique query-based hash value matches the unique first Bloom filter-based hash value from among the at least one unique Bloom filter-based hash value;

in the case that the unique query-based hash value matches the unique first Bloom filter-based hash value associated with the first Bloom filter-based execution plan, selecting the first Bloom filter-based execution plan as a selected execution plan;

in the case that the unique query-based hash value does not match any unique Bloom filter-based hash value, constructing a new Bloom filter;

in the case that the unique query-based hash value does not match any unique Bloom filter-based hash value, generating a new Bloom filter-based execution plan corresponding to the generated new Bloom filter;

in the case that the unique query-based hash value does not match any unique Bloom filter-based hash value, executing the AQE-based execution plan;

in the case that the unique query-based hash value does not match any unique Bloom filter-based hash value, executing the new Bloom filter-based execution plan;

in the case that the unique query-based hash value does not match any unique Bloom filter-based hash value, collecting a metric for the executed AQE-based execution plan and for the executed new Bloom filter-based execution plan;

in the case that the unique query-based hash value does not match any unique Bloom filter-based hash value, generating a pair of scores from the metric for each of the executed AQE-based execution plan and the executed new Bloom filter-based execution plan;

in the case that the unique query-based hash value does not match any unique Bloom filter-based hash value, determining a greater score from among the generated pair of scores;

in the case that the unique query-based hash value does not match any unique Bloom filter-based hash value, selecting from the executed AQE-based execution plan and the executed new Bloom filter-based execution plan with the greater score to be the selected execution plan;

wherein the metric is selected from the group consisting of: the number of shuffle bytes, an execution time, and a memory usage of each of the executed AQE-based execution plan and the executed new Bloom filter-based execution plan;

wherein generating the pair of scores includes generating a pair of weighted scores for each of the executed AQE-based execution plan and the executed new Bloom filter-based execution plan, and wherein the weighted scores are determined from a predetermined weighting rule using weights of 50% for the number of shuffle bytes, 30% for the execution time, and 20% for the memory usage;

executing the selected execution plan to join the plurality of initial tables to generate the joined table; and outputting the joined table.

7. The computer-based method of claim 6, further comprising, prior to generating the unique query-based hash value, extracting query data from the query, wherein the query data is selected from the group consisting of a structure of the query, a join condition, a join key, and a predicate, and wherein generating the unique query-based hash value from query and from the extracted query data.

8. The computer-based method of claim 6, further comprising, prior to generating the unique query-based hash value, detecting a case that the query is in a normalized form; and prior to generating the unique query-based hash value, responsive to the case that the query is not in the normalized form, normalizing the query.

9. The computer-based method of claim 6, wherein the plurality of tables is stored in a distributed data processing system.

10. The computer-based method of claim 6, further comprising:

storing historical query data including a plurality of historical query patterns, wherein each historical query pattern includes a query frequency and a join selectivity; and prior to generating a new Bloom filter-based execution plan corresponding to the generated new Bloom filter, tuning the new Bloom filter based on parameters using the plurality of historical query patterns.

11. A non-transitory computer-readable storage medium storing instructions executable by a processor to join a plurality of initial tables, the instructions comprising:

store at least one unique Bloom filter-based hash value including a unique first Bloom filter-based hash value;

store an Adaptive Query Execution (AQE) based execution plan and at least one Bloom filter-based execution plan including a first Bloom filter-based execution plan, wherein each at least one Bloom filter-based execution plan is associated with a respective stored at least one unique Bloom filter-based hash value and the first Bloom filter-based execution plan is associated with the unique first Bloom filter-based hash value;

receive a query to join the plurality of initial tables;

generate a unique query-based hash value from the query;

determine a case that the unique query-based hash value matches the unique first Bloom filter-based hash value from among the at least one unique Bloom filter-based hash value;

in the case that the unique query-based hash value matches the unique first Bloom filter-based hash value associated with the first Bloom filter-based execution plan, select the first Bloom filter-based execution plan as a selected execution plan;

in the case that the unique query-based hash value does not match any unique Bloom filter-based hash value, construct a new Bloom filter;

in the case that the unique query-based hash value does not match any unique Bloom filter-based hash value, generate a new Bloom filter-based execution plan corresponding to the generated new Bloom filter;

in the case that the unique query-based hash value does not match any unique Bloom filter-based hash value, execute the AQE-based execution plan;

in the case that the unique query-based hash value does not match any unique Bloom filter-based hash value, execute the new Bloom filter-based execution plan;

in the case that the unique query-based hash value does not match any unique Bloom filter-based hash value, collect a metric for the executed AQE-based execution plan and for the executed new Bloom filter-based execution plan;

in the case that the unique query-based hash value does not match any unique Bloom filter-based hash value, generate a pair of scores from the metric for each of the executed AQE-based execution plan and the executed new Bloom filter-based execution plan;

in the case that the unique query-based hash value does not match any unique Bloom filter-based hash value, determine a greater score from among the generated pair of scores;

in the case that the unique query-based hash value does not match any unique Bloom filter-based hash value, select from the executed AQE-based execution plan and the executed new Bloom filter-based execution plan with the greater score to be the selected execution plan;

wherein the metric is selected from the group consisting of: the number of shuffle bytes, an execution time, and a memory usage of each of the executed AQE-based execution plan and the executed new Bloom filter-based execution plan;

wherein generate the pair of scores includes generate a pair of weighted scores for each of the executed AQE-based execution plan and the executed new Bloom filter-based execution plan, and wherein the weighted scores are determined from a predetermined weighting rule using weights of 50% for the number of shuffle bytes, 30% for the execution time, and 20% for the memory usage;

execute the selected execution plan to join the plurality of initial tables to generate the joined table; and output the joined table.

12. The non-transitory computer-readable storage medium of claim 11, the instructions further comprising, prior to generating the unique query-based hash value, extract query data from the query, wherein the query data is selected from the group consisting of a structure of the query, a join condition, a join key, and a predicate, and wherein generate the unique query-based hash value from query and from the extracted query data.

13. The non-transitory computer-readable storage medium of claim 11, the instructions further comprising, prior to generating the unique query-based hash value, detect a case that the query is in a normalized form; and prior to generating the unique query-based hash value, responsive to the case that the query is not in the normalized form, normalize the query.

14. The non-transitory computer-readable storage medium of claim 11, the instructions further comprising:

store historical query data including a plurality of historical query patterns, wherein each historical query pattern includes a query frequency and a join selectivity; and prior to generating a new Bloom filter-based execution plan corresponding to the generated new Bloom filter, tune the new Bloom filter based on parameters using the plurality of historical query patterns.

* * * * *